No. 680,110. Patented Aug. 6, 1901.
D. E. BARTON.
WHEEL BOX AND AXLE.
(Application filed Jan. 10, 1901.)
(No Model.) 2 Sheets—Sheet 1.

Witnesses,
Harry Kilgord
C. H. Turner

Inventor,
Delbert E. Barton,
By his Attorneys,
Williamson & Merchant

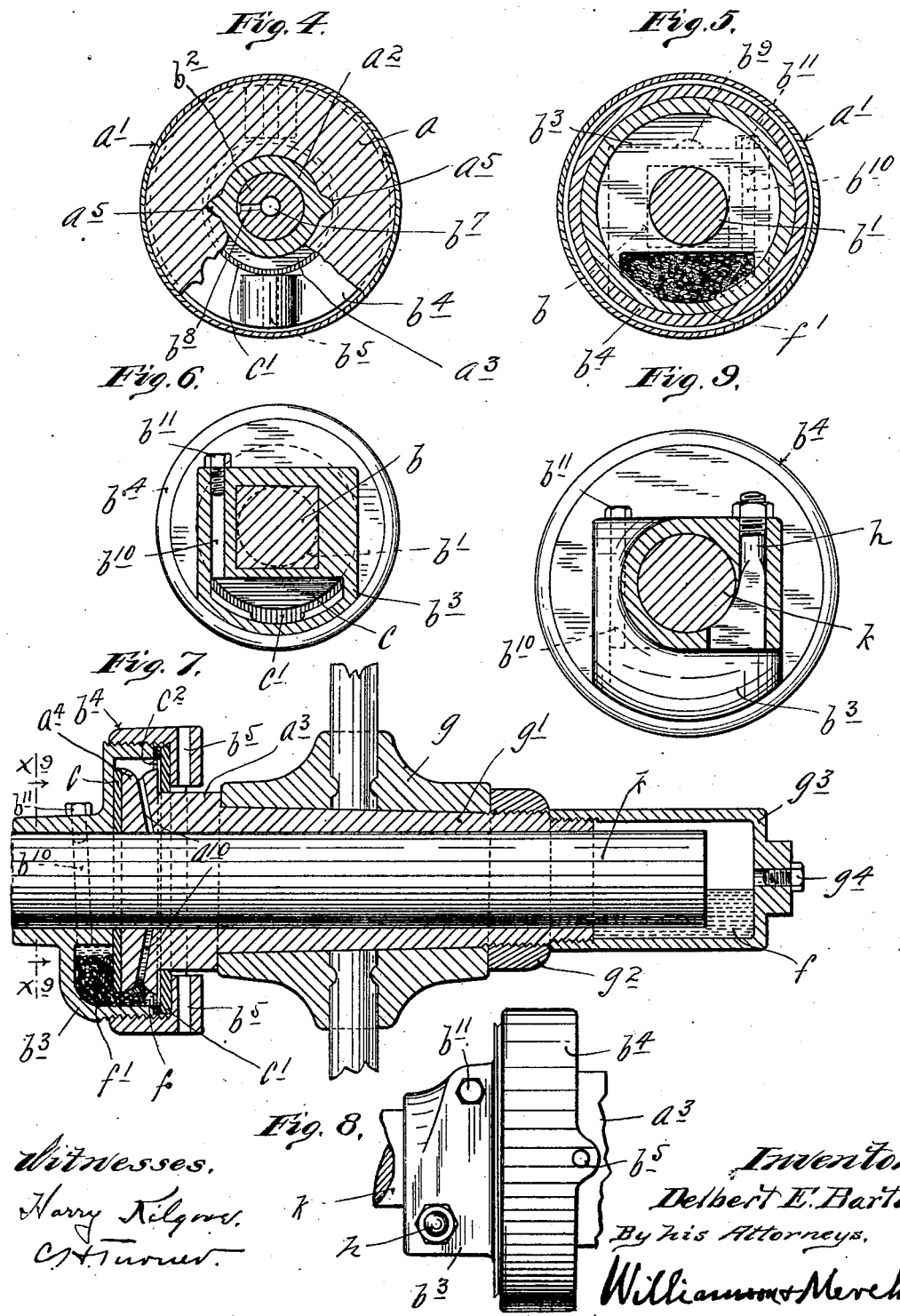

UNITED STATES PATENT OFFICE.

DELBERT E. BARTON, OF MINNEAPOLIS, MINNESOTA.

WHEEL BOX AND AXLE.

SPECIFICATION forming part of Letters Patent No. 680,110, dated August 6, 1901.

Application filed January 10, 1901. Serial No. 42,717. (No model.)

*To all whom it may concern:*

Be it known that I, DELBERT E. BARTON, a citizen of the United States, residing at Minneapolis, in the county of Hennepin and State of Minnesota, have invented certain new and useful Improvements in Wheel Boxes and Axles; and I do hereby declare the following to be a full, clear, and exact description of the invention, such as will enable others skilled in the art to which it appertains to make and use the same.

My invention relates to axles and boxes for vehicles and agricultural machines, and has for its object to improve the construction of this class of devices with a view of securing perfect lubrication for long periods of time, such as a season's use, from a single charge of oil.

To this end my invention consists of the novel devices and combinations of devices which will be hereinafter described, and defined in the claims.

The invention is illustrated in the accompanying drawings, wherein like notations refer to like parts throughout the several views.

Figure 1:
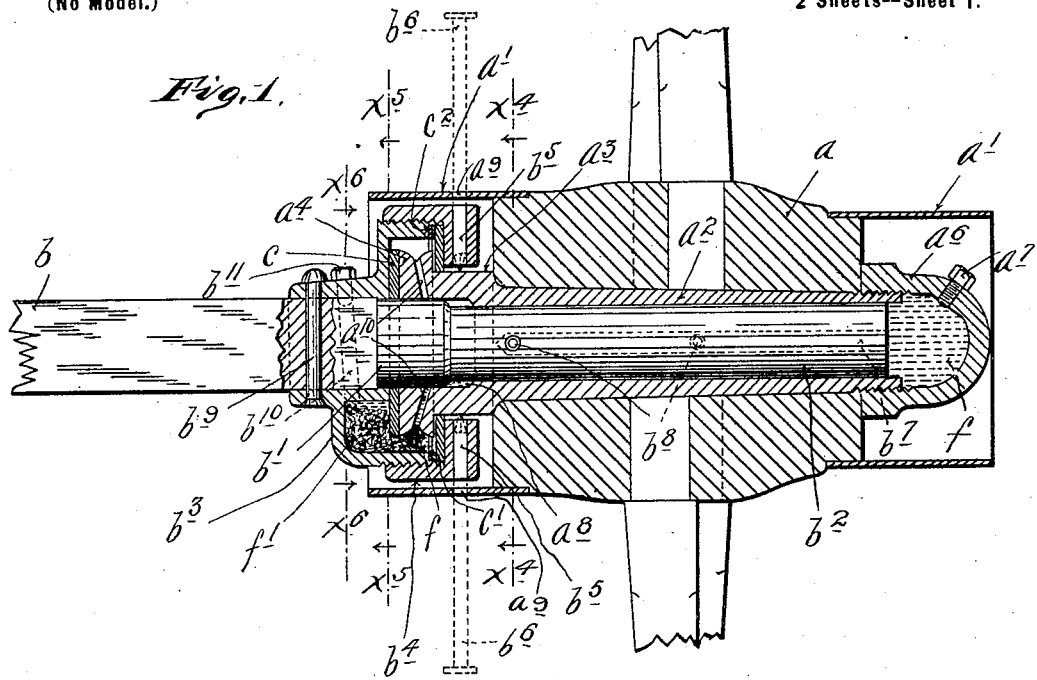
Figure 2:
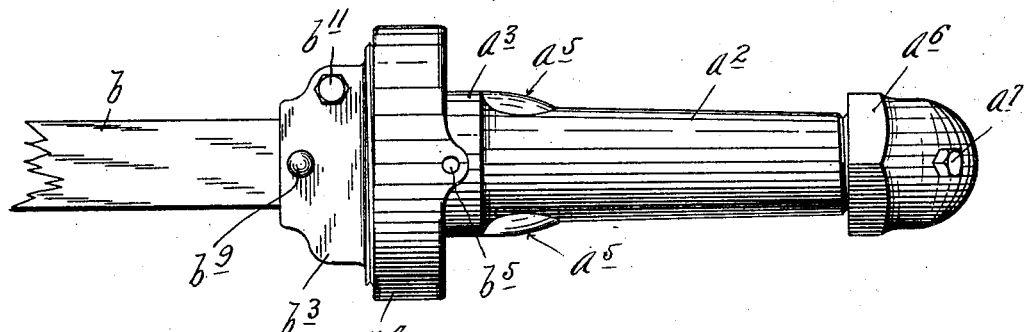
Figure 3:
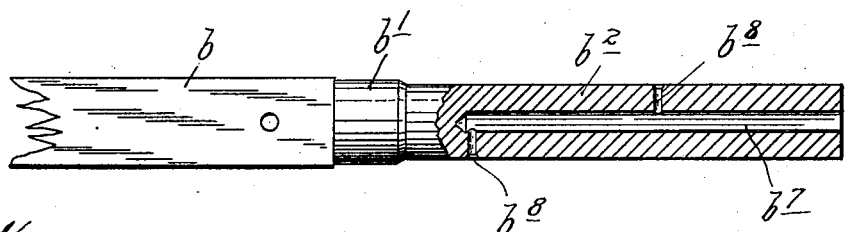

In said drawings, Figure 1 is a view chiefly in longitudinal vertical section, but partly in elevation, with some portions broken away, illustrating my invention as preferably applied when used on vehicles with wheels having wooden or wood lined-hubs. Fig. 2 is a plan view of some of the parts shown in Fig. 1 detached. Fig. 3 is a detail, partly in plan and partly in section, showing the axle detached. Fig. 4 is a vertical cross-section on the line $x^4 x^4$ of Fig. 1 with some parts broken away. Fig. 5 is a vertical cross-section on the line $x^5 x^5$ of Fig. 1. Fig. 6 is a vertical cross-section on the line $x^6 x^6$ of Fig. 1.
Fig. 7 is a view chiefly in vertical longitudinal section, but partly in elevation, with some portions broken away, illustrating the invention as applied to an agricultural machine—such, for example, as a cultivator or sulky-plow. Fig. 8 is a detail in plan with some portions broken away, illustrating some of the parts shown in Fig. 7; and Fig. 9 is a vertical cross-section on the line $x^9 x^9$ of Fig. 7.

Attention will first be given to the construction illustrated in Figs. 1 to 6, inclusive. The wooden hub-body $a$ has the usual sand-bands $a'$, applied thereto in the usual way. The axle-box $a^2$ is of greater length than the hub-body and is of such construction as to afford an enlarged portion $a^3$, which at its inner end is provided with a raised bead or flange $a^4$. The axle-box $a^2$ and the hub-body $a$ are rigidly secured together in any suitable way. As shown, the axle-box is provided with lateral lugs $a^5$ near its enlarged portion $a^3$, which when the two parts are driven or otherwise forced together engage with the wood and prevent the box from turning within the hub-body. The main or most reduced portion of the axle-box is preferably slightly tapered outward so that the hub-body can be driven thereon with a tight fit. The outer end of the axle-box projects through the hub-body and is screw-threaded for engagement with the screw-threaded oil-well cap $a^6$, which is applied thereto, as shown in Figs. 1 and 2, and also serves to lock the hub-body in proper position on the axle-box. The cap $a^6$ is provided with a suitable charging-opening which is normally closed by a screw-threaded stop-plug $a^7$. The outer end of the axle-box is open and projects into the oil-well within the cap $a^6$. The axle-box is counterbored for a portion of its length from its inner end, as shown in Fig. 1 at $a^8$. The axle-bar $b$ is turned down to afford a spindle made up of a short enlarged section $b'$ and a long or main section $b^2$, as best shown in Figs. 1 and 2. Sufficient clearance is left between the enlarged portion $b'$ of the spindle and the end of the counterbore in the box $a^2$ to afford an oil-chamber $a^8$. To the axle-bar $b$ is fixed in any suitable way a lubricating-box $b^3$ of proper construction to receive the raised flange or bead $a^4$ of the axle-box and permit the same to turn within a bath of oil and is also of the proper construction for coöperation with a retaining-nut $b^4$ to connect together the hub and axle. As shown, the box $b^3$ is screw-threaded on its periphery, and the nut $b^4$ is of angular form in longitudinal section and is provided with an internal thread on its horizontal or flange portion for engagement with the external thread of the lubricating-box $b^3$. The vertical portion of the retaining-nut $b^4$ embraces the raised bead $a^4$ of the axle-box, and thereby detachably secures the hub and axle in working position. Between the inner end of the axle-box and the body portion of the lubricating-box $b^3$ I place a washer $c$, composed of leather or wood cut crosswise of the grain. Between the nut $b^4$ and the raised bead $a^4$ of the axle-box I place a similar washer $c'$ of the same material, which is of such diameter as to also work between the nut and the surface of the box $b^3$ against which the nut clamps. Between the leather or wooden washer $c'$ and the adjacent surface of the lubricating-box $b^3$ I also apply a series of compensating-washers $c^2$, which may be composed of paper, cloth, thin leather, or other suitable material and which may be removed one after the other in succession, and by then tightening the nut $b^4$ any lost motion due to wear and tear of the parts may be taken up. The nut $b^4$ is provided with radial holes $b^5$, preferably two or more located diametrically opposite to each other, for the application thereto of wire nails $b^6$ or other conveniently available devices to afford the requisite leverage for manipulating the nut. As shown, the inner member of the sand-bands $a'$ on the wheel-hub is also provided with passages $a^9$, two or more opposite to each other, adapted to register with the nail-holes $b^5$ in the nut $b^4$, thereby permitting the nails $b^6$ to be applied through the sand-band and into the nut, as shown in Fig. 1. This enables the wheel itself to be used as a wrench for applying or removing the nut. The raised bead $a^4$ at the inner end of the axle-box is grooved on its periphery, the groove preferably being of V shape in cross-section, and said bead is also provided with oil-ducts $a^{10}$, extending therethrough from the lowest point of the peripheral groove to the bore of the axle-box. The main or most reduced portion $b^2$ of the spindle is formed hollow or is bored out to afford an axial chamber $b^7$ open at its outer end to receive oil from the cap $a^6$ and provided with radial distributing-ducts $b^8$, leading from the chamber $b^7$ to the periphery of the spindle. The lubricating-box $b^3$ is preferably a malleable casting or a forging, but may be of any suitable material and be made fast to the axle-bar $b$ in any suitable way. As shown, the said lubricating-box $b^3$ is assumed to have been driven into place, and for further security a rivet $b^9$ is applied to connect the same to the axle. The said lubricating-box $b^3$ might be shrunk into position or be applied by hydraulic pressure. The said lubricating-box $b^3$ is provided with a suitable charging-hole $b^{10}$, as best shown in Fig. 6, which is normally closed by a screw-threaded plug $b^{11}$. When the parts are in working position, as shown in Fig. 1, the cap $a^6$ and the box $b^3$ are filled with oil to their full capacity, and the closing-plugs are then applied to the charging-holes, and the wheel is in condition to use for a long period of time, such as a whole season, without requiring any recharge of oil. Having regard to the action, it is obvious that the oil $f$ from the cap $a^6$ will fill the chamber $b^7$ within the spindle and the radial ducts $b^8$, leading therefrom to the periphery of the spindle. It is also obvious that the raised bead $a^4$ at the inner end of the axle-box turns constantly in the bath of oil $f$, carried by the box $b^3$, and hence it follows that the oil gathered on the periphery of the bead and in the oil-ducts $a^{10}$ will work downward through the said ducts and be delivered therefrom directly onto the enlarged portion $b'$ of the spindle whenever the wheel is running slowly or is standing still. An abundant supply of oil is therefore secured to the enlarged inner end portion of the spindle, which is usually the most difficult point to oil. The oil so supplied, as above described, from the outer end cap $a^6$ and the lubricating-box $b^3$ to the periphery of the spindle will work its way throughout the entire length of the spindle and accumulate to a greater or less extent in the clearance-space or oil-chamber at the end of the counterbore $a^8$ or the otherwise unoccupied space between the enlarged portion $b'$ of the spindle and the adjacent end of the counterbore in the axle-box. Hence it may be said that the spindle practically floats in oil. In any event it is strictly true that all the bearing-surfaces are constantly immersed in oil. Friction is therefore reduced to a minimum, and owing to the large quantity of oil with which the oil-boxes may be charged it follows that the vehicle may be used for a great length of time, such as a whole season, without requiring any additional charge of oil to the axles and axle-boxes.

It is also obvious from the construction described that the end thrust between the axle-box and the fixed or non-rotary parts carried by the axle—to wit, the lubricating-box $b^3$ and the nut $b^4$, when applied thereto—is taken on antifriction-surfaces afforded by the washers $c$ $c'$, of leather or wood, cut crosswise of the grain, and these washers being thus composed of material which is porous and slightly compressible will themselves be kept constantly charged with oil. Waste $f'$ may be applied within the box $b^3$ to make sure that all the oil may be available to the bead of the axle-box which runs in the bath of oil.

From the construction described it is further obvious that the cap $a^6$ is an absolute bar to the entrance of sand, dust, and dirt at the outer end of the spindle and axle-box and that the washer $c'$ forms a packing which prevents the entrance of sand or dirt at the joint between the nut $b^4$ and the bead $a^4$ of the axle-box.

It must be equally apparent that the construction above described is extremely simple and cheap to make. This fact of the cheapness of construction and the provision for perfect lubrication for long periods of time from a single charge especially adapt this axle and box for use on the cheaper classes of vehicles wherein roller-bearings are not usually applied because of the extra cost and also adapt the same for use on agricultural machines wherein economy of construction and good lubrication are also of primary importance.

When applying the invention to agricultural machines, I preferably employ the modified construction illustrated in Figs. 7 to 9, inclusive. In agricultural machines the wheel-hubs are usually of metal, and in many classes of machines, such as cultivators, it is desirable to provide for the adjustment of the wheels lengthwise of the axle in order to adapt the machines to the cultivation of plants in rows which vary in width of spacing crosswise of the line of the machine's travel. The modification illustrated in Figs. 7 to 9, inclusive, meets these conditions. The wheel-hub $g$ is of metal and is tightly driven into place on the axle-box $g'$, and the two parts are further secured together by a lock-ring $g^2$, which has screw-threaded engagement with a projecting portion of the axle-box and abuts against the outer end of the wheel-hub. The oil-well cap $g^3$ is applied to the axle-box in the same way as in the main views, but is of greater length, and the charging-hole, with its plug $g^4$, is located at the end of the cap. The end of the cap is also of angular form in cross-section to permit the application of a wrench thereto when applying the same to working position. The axle-box $g'$ is not counterbored, but is otherwise similar at its inner end to the axle-box shown in the main views. The lubricating-box $b^3$ is just the same as in the main views, but is provided with a drift-bolt $h$, suitably seated therein and adapted to engage with the axle $k$ for tightly securing said box $b^3$ to the axle at any desired point of longitudinal adjustment thereon. The axle $k$ is a plain cylindrical rod and is not made hollow or bored out, as in the other views. When the parts are in working position, the outer end of the axle $k$ turns within the bath of oil carried by the cap $g^3$, and the bead at the inner end of the axle-box turns within the bath of oil within the box $b^3$, as in the construction shown in the main views. The distribution of the oil from the box $b^3$ is substantially the same as in the main views, with the exception of whatever difference may be due to the presence of the oil-chamber in the counterbore $a^8$ of the axle-box $a^2$; but the distribution from the outer end supply or cap $g^3$ differs in the fact that reliance is placed upon the supply gathered by the outer end of the axle, which runs in the bath of oil. With the construction as shown in Figs. 7, 8, and 9 the cap $g^3$ cannot be charged to its full capacity if the spindle is to run in a true horizontal plane; but if the spindle is to be set on an angle relative to the horizontal plane then the cap $g^3$ can be charged with oil to its full capacity before the wheel is applied to the axle. It is obvious that with this modification extremely cheap construction is secured and that the wheel may be set at any desired point lengthwise of the axle.

While this invention was especially designed for use on the cheaper class of vehicles and for use on agricultural machines, it is obvious that the same is capable of general application wherever the corresponding functions are desired. It will be further understood that some of the details of the construction may be changed without departing from the spirit of the invention.

What I claim, and desire to secure by Letters Patent of the United States, is as follows:

1. The combination with an axle-box having a raised flange or bead at its inner end, of an axle having a lubricating-box rigid therewith, constructed to receive said axle-box bead within a bath of oil, and means for detachably connecting said parts together, substantially as described.

2. The combination with an axle-box having a raised flange or bead, at its inner end, provided with oil-distributing ducts therethrough, of an axle having a lubricating-box rigid therewith, constructed to receive said axle-box bead within a bath of oil, and means for detachably connecting said parts together, substantially as described.

3. The combination with an axle-box having a raised bead or flange at its inner end, provided with oil-ducts thereto, of an axle having a lubricating-box rigid therewith constructed to receive said axle-box bead within a bath of oil, and a retaining-nut of angular form in longitudinal section having screw-threaded engagement with said lubricating-box and embracing said axle-box bead, substantially as described.

4. The combination with an axle, of an axle-box having a raised bead or flange, at its inner end, a lubricating-box securable to the axle at any desired point of adjustment, lengthwise of the axle, and constructed to receive said axle-box bead within a bath of oil, and means for detachably connecting said parts, substantially as described.

5. The combination with an axle, of an axle-box having a raised bead or flange at its inner end, provided with lubricating-ducts therethrough, a lubricating-box securable to the axle at any desired point of adjustment, lengthwise of the axle, and constructed to receive said axle-box bead within a bath of oil, and means for detachably connecting said parts, substantially as described.

6. The combination, with an axle-box having a raised flange or bead, at its inner end, provided with oil-ducts, and having at its outer end an oil-well cap secured thereto and rotating therewith, of an axle having a lubricating-box constructed to receive said axle-box bead within a bath of oil, the outer end of the axle terminating inward of the outer end of said oil-well cap, and means for detachably connecting said axle-box and axle, substantially as described.

In testimony whereof I affix my signature in presence of two witnesses.

DELBERT E. BARTON.

Witnesses:
M. M. McGRORY,
F. D. MERCHANT.